United States Patent [19]

Grassmann

[11] 4,267,461
[45] May 12, 1981

[54] ARRANGEMENT FOR SUPPRESSING HIGH FREQUENCY CURRENTS IN BEARINGS OF SHAFTS

[75] Inventor: Hans-Christian Grassmann, Igelsdorf, Fed. Rep. of Germany

[73] Assignee: Siemens Aktiengesellschaft, Berlin and Munich, Fed. Rep. of Germany

[21] Appl. No.: 891,895

[22] Filed: Mar. 30, 1978

[30] Foreign Application Priority Data

Apr. 20, 1977 [DE] Fed. Rep. of Germany ....... 2717593

[51] Int. Cl.³ ............................................. H03H 1/00
[52] U.S. Cl. ...................................... 307/105; 308/1R
[58] Field of Search .................. 307/105; 310/71, 72, 310/90; 308/1 R

[56] References Cited

U.S. PATENT DOCUMENTS 3,881,137 4/1975 Thanawala ........................... 307/105

FOREIGN PATENT DOCUMENTS 1217229 5/1960 France .

Primary Examiner—L. T. Hix
Assistant Examiner—S. D. Schreyer
Attorney, Agent, or Firm—Kenyon & Kenyon

[57] ABSTRACT

In order to suppress the high-frequency currents in bearings of shafts, the bearing capacity is arranged in the configuration of an electric quadrupole in such a manner that the high frequency voltage becomes a minimum.

12 Claims, 2 Drawing Figures

ARRANGEMENT FOR SUPPRESSING HIGH FREQUENCY CURRENTS IN BEARINGS OF SHAFTS

This invention relates to an arrangement for suppressing high-frequency currents in bearings of shafts in treatment apparatus having operating frequencies above 10 kHz.

It is known to short circuit the bearings of shafts in order to avoid radio and television interferences (see, for instance, German Pat. No. 146 636). In connection with electric d-c and a-c machines it is further known to avoid detrimental bearing currents by an insulated construction of the bearing (see, for instance, German Auslegeschrift No. 1 161 992). The known arrangements, however, are ineffective for high frequency currents above 10 kHz, since, due to the geometric dimensions of the insulation structure of the bearing, especially for larger shaft diameters from 20 mm up, a capacity is obtained, the reactance of which is not high enough in relation to the capacity of the bearing. This brings about an excessively high bearing voltage due to the capacitive voltage division. It has been found that the bearing voltage must not exceed approximately 0.7 V, since, otherwise, fritting takes place in the bearing, which leads to the electroerosive destruction of the bearing. It is furthermore necessary, on the basis of interference elimination principles as well as for reasons of insulation, to bring the shaft ends of rotating parts in high frequency current carrying apparatus to ground or chassis potential as far as possible.

SUMMARY OF THE INVENTION

It is an object to the present invention to bring the shaft ends to a potential close to ground and to reduce detrimental bearing currents to a tolerable magnitude by simple means, or to avoid them altogether. According to the present invention, this is achieved, in an arrangement of the kind mentioned at the outset, by connecting impedances in series with the resulting capacitive bearing impedance in such a manner that the series branch has high impedance and by shunting a low resistance electric resistor across this series branch in such a manner that an electric quadrupole, which causes the high frequency voltage at the bearing impedance to reach a minimum, results. With this specially designed pi filter, a potential close to ground is obtained and, in addition, the high frequency currents are conducted away from the bearing.

The low impedance of the pi quadrupole is advantageously realized as a sliding contact. As the high impedance, a capacitor or a parallel resonant circuit tuned to the operating frequency is used. For reducing the bearing currents further, it may be advantageous to also provide a further sliding contact directly parallel to the bearing capacity.

For checking and monitoring the operational reliability of the quadrupole, the voltage at the series circuit of the high impedance and the bearing capacity can advantageously be monitored and utilized for enabling alarm signals.

DETAILED DESCRIPTION OF THE INVENTION

Figure 1:
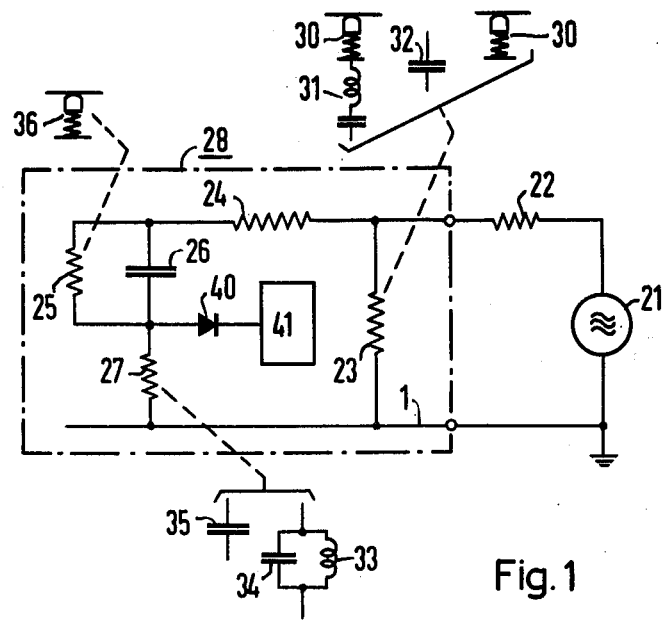
FIG. 1 shows an equivalent electrical circuit of the high frequency arrangement of the present invention.

In the equivalent electric circuit shown in FIG. 1, the high frequency source 21 which induces voltages in the shaft is shown. Assume that the frequency of these voltages is, say, around 30 MHz. The internal impedance of this voltage source is represented by resistor 22. In an ordinary bearing, a bearing capacity 26 through which the high frequency current would then flow off the housing also exists. To prevent this from happening, and in order to control the potential of the shaft so as to be as near to ground as possible, the bearing capacity 26 is arranged in the configuration of an electrical pi quadrupole 28. On the input side, this pi quadrupole has a shunt arm with a resistor 23 which has an impedance much lower than the bearing impedance. Into the series arm is connected a relatively high impedance 24, which can be realized, for instance, as a capacitor or as an inductance, or is represented by a section of the shaft. In the next shunt arm, which contains the bearing capacity 26, a relatively high impedance 27 is additionally provided in series with the bearing capacity which determines the bearing impedance. Shunted across the bearing capacity 26 is a further resistor 25 having a resistance low in relation to the bearing impedance.

The low impedance 23 can be, for instance, a sliding contact 30 sliding on the shaft, a capacitor 32 or a sliding contact 30 in series with a series resonant circuit 31. As the series impedance 27 either a capacitor 35 which is small relative to the bearing capacity 26, or a parallel resonant circuit in the form of a capacitor 34 and inductance 33, tuned to the operating frequency can be used. The low resistance resistor 25 is advantageously also a sliding contact 36. The arrangement described here has the property that it lowers the potential after the impedance 22 to a great extent and keeps the residual currents or residual voltages that remain largely away from the bearing.

The voltage at the midpoint between the bearing capacity 26 and the high impedance 27 can be utilized for monitoring the quadrupole for proper functioning; more specifically, by rectifying the high frequency voltage prevailing there by means of the diode 40 and making it available as a measuring signal to a monitoring device 41.

Figure 2:
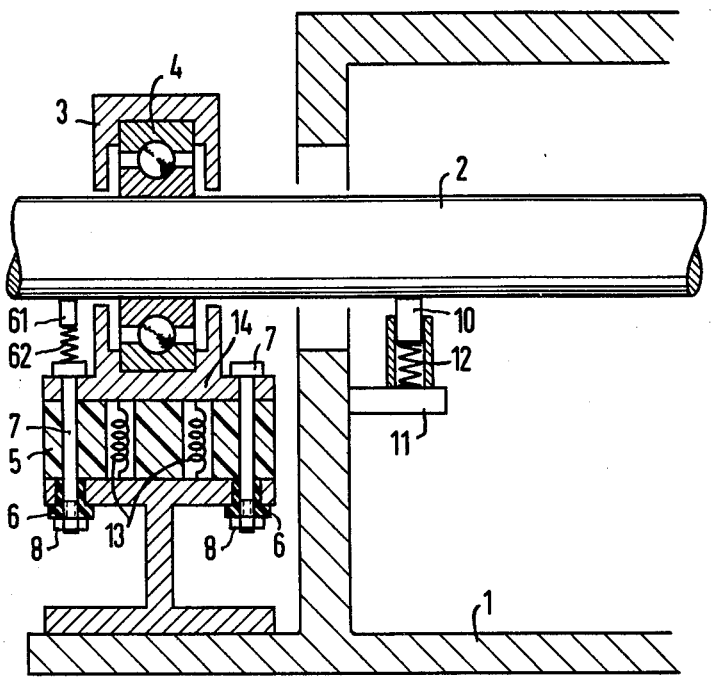
FIG. 2 illustrates the mechanical design of a bearing support of a shaft in a high frequency apparatus.

FIG. 2 shows the mechanical design of the equivalent circuit. A shaft 2 leading through the housing wall 1 of a high frequency treatment chamber is supported in a bearing 4 outside the HF chamber. This part corresponds to the voltage source 21, the internal impedance 22, the series resistance 24 (if applicable) and the bearing capacity 26. As the low impedance 23, in the context of the quadrupole 28 shown in FIG. 1, sliding contact 10, which is fastened to the housing 1 by means of compression springs 12 and a mounting arm 11, is used.

The bearing 4 is enclosed by a bearing housing 3, which is fastened on a support plate 14. Support plate 14 rests on an insulating plate 5 and is fastened insulated via screws 7, insulating washers 6 and nuts 8. In analogy to the equivalent electric circuit, the insulating plate 5 corresponds to the capacitor 35 or the capacitor 34 of the parallel resonant circuit, if holes in which a tunable inductance 13 is accommodated are further located in the insulating plate 5. Inductance 13 in the insulating plate 5 corresponds to the inductance 33 in the equivalent circuit according to FIG. 1.

The impedance 25 of FIG. 1, which is shunted across the bearing capacity 26 is represented in FIG. 2 by the sliding contact 61 and the compression spring 62; the sliding contact slides on the shaft 2 and the compression spring is connected to the bearing housing 3 in an electrically conducting manner.

This arrangement described here has the property of bringing the shaft to a potential close to that of the housing and of preventing bearing currents from flowing via the bearing 4.

What is claimed is:

1. An arrangement for suppressing high frequency currents in bearings of shafts in high frequency treating apparatus with operating frequencies above 10 kHz, the bearing being located outside the treatment apparatus housing and mechanically connected to the housing of the treatment apparatus, said bearing disposed in a housing and exhibiting a capacitive impedance between the shaft and its housing and the bearing shaft exhibiting an inductive impedance at said frequencies, comprising:
   (a) a further impedance connected in series with the bearing impedance between the bearing housing and the housing of the treatment chamber, the sum of said further impedance and the impedance of said shaft being great in comparison to the bearing impedance; and
   (b) an additional impedance inside the treatment chamber connected between the shaft and the housing of the treatment chamber, the value of said additional impedance being low in comparison to said capacitive bearing impedance.

2. The arrangement according to claim 1, wherein said additional impedance comprises a sliding contact.

3. The arrangement according to claim 1, wherein said additional impedance comprises the combination of a sliding contact and a series resonant circuit tuned to the operating frequency.

4. The arrangement according to claim 1, wherein said additional impedance comprises an electric capacitor.

5. The arrangement according to claim 1, wherein said further impedance comprises an electric capacitor.

6. The arrangement according to claim 1, wherein said further impedance comprises an induction coil.

7. The arrangement according to claim 1 and further includes an additional low resistance in the form of a sliding contact shunted across the bearing impedance.

8. The arrangement according to claim 1 and further including means to rectify the voltage across the further impedance and means to enable an alarm signal in the event of an excessive voltage change.

9. The arrangement according to claim 1 wherein said impedances are selected so that the high frequency voltage at the bearing impedance is also minimized for harmonics.

10. The arrangement according to claim 1, wherein said further impedance comprises a capacitor so that the bearing impedance and further impedance form a voltage divider.

11. The arrangement according to claim 1, wherein said further impedance comprises a capacitor having coupled thereacross, in parallel, an inductance, said parallel circuit being tuned to the operating frequency to thereby present a high impedance.

12. The arrangement according to claim 11, wherein said bearing is disposed on an insulating base which is in turn disposed on said housing, said base being designed as the capacitor of said further impedance and wherein said inductance is tunable and is accommodated in said insulating base.

* * * * *